Oct. 18, 1949.  J. B. CLAY  2,484,980

TILTING GATE

Filed Feb. 6, 1946

Inventor:
Joseph B. Clay.
By Bair & Freeman
Attys.

Patented Oct. 18, 1949

2,484,980

UNITED STATES PATENT OFFICE 2,484,980

TILTING GATE

Joseph B. Clay, Cedar Falls, Iowa, assignor to Clay Equipment Corporation, Cedar Falls, Iowa, a corporation of Iowa Application February 6, 1946, Serial No. 645,828

1 Claim. (Cl. 160—156)

The object of my invention is to provide a gate for use on farms and elsewhere, so constructed that it may be easily and quickly adjusted for tilting the free end of the gate to different positions.

Thus my gate may be hung in horizontal position for ordinary use, and it can be adjusted without tools to raise the free end of the gate to clear ice or snow, or allow the free passage of small animals.

To this end I provide a gate having rigid upright end members, and with rigid longitudinal members pivoted thereto, and having a brace connected to one corner and adjustably connectible near a diagonally opposite corner of the gate.

With these and other objects in view, my invention consists in the construction, arrangement and combination of the various parts of my tilting gate whereby the objects contemplated are attained, as hereinafter more fully set forth, pointed out in my claims, and illustrated in the accompanying drawings, wherein:

Figure 1:
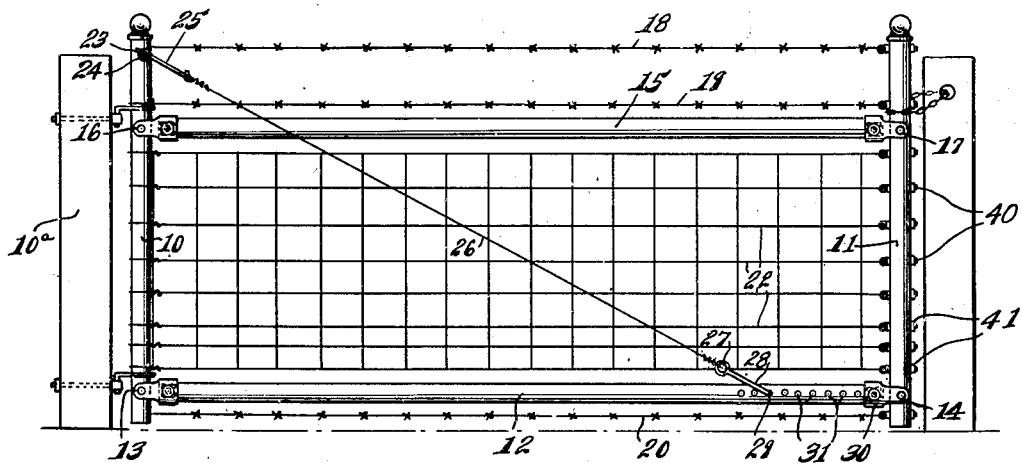
Figure 1 shows an elevation of my improved gate.

In the accompanying drawings, the numeral 11 indicates the upright rigid member at the free end of the gate. At the other end of the gate is an upright rigid member 10 adapted to be hinged to a supporting post 10a in any suitable way. Near the bottom of the gate the members 10 and 11 are connected by a rigid connecting member 12, pivoted at 13 and 14 to the upright members 10 and 11. Near the upper part of the gate is a rigid connecting member 15 connecting the members 10 and 11 and pivoted thereto at 16 and 17. Members 10 and 11 may be connected at their upper ends by barbed wire 18 and 19 and their lower ends may be connected by a barbed wire 20, and they may be also connected by a series of wires 22, which are preferably plain wire.

As shown, the wires are connected at one end of the gate to bolts 40 extending through the upright 11 and provided with adjustable nuts 41 which may be used to control the tension of the wires.

Near the top of the upright member 10 is an ordinary eye bolt or the like 23 on which is held a broken ring or loop 24 formed on a short rod 25.

The rod 25 is connected to a cable or wire 26 which extends diagonally downwardly and toward the free end of the gate and is connected at its lower end to a loop 27 on a short rod 28 which has at its free end a hook 29.

Figure 2:
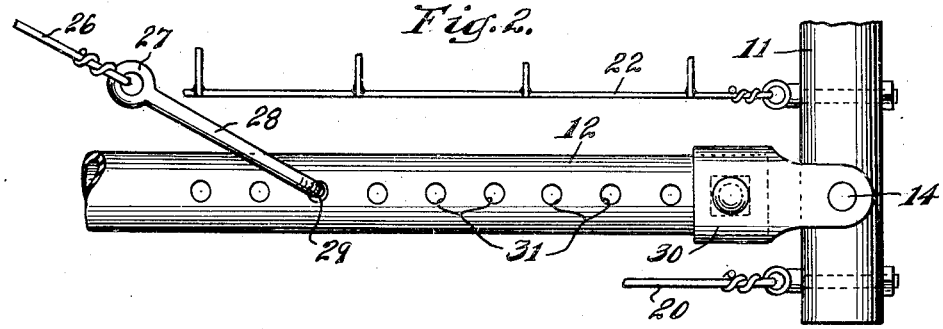
Figure 2 is a detail of a corner of the gate, showing an upright member and a horizontal member, and illustrating the means for connecting the brace at various points on the horizontal member.
Figure 3:
Figure 3 is a detail of one end of the brace.
Figure 4:
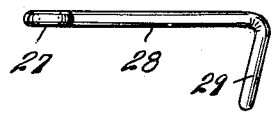
Figure 4 is a detail illustrating a hook at the other end of the brace.

The rigid members 12 and 15 may be made of pipe, as shown in Figure 2, having fittings 30 at their ends which fittings are pivoted to the uprights 10 and 11.

The member 12 is provided with longitudinally spaced holes 31 near the free end of the gate to selectively receive the hook 29. Ordinarily the hook 29 is inserted through a hole 31 so located that the gate will be normally held in ordinary horizontal position.

If it is desired to tilt the free end of the gate upwardly, the hook 29 may be removed and inserted into a forward hole 31. The degree of tilting depends on the hole selected to receive the hook 29. The free end of the gate may be thus raised when desired to take care of any sagging which may have occurred in use. Or, if the gate tends to drag over snow, ice or frozen mud, the free end can be raised to clear the obstructions.

If it is desired to raise the free end high enough to allow small pigs or small animals to pass under the gate, this also can be done by adjusting the gate so as to insert the hook 29 into the proper hole.

A gate of this kind can be built very economically and the tilting adjustment of the gate accomplished without loosening any nuts and the like, and without the aid of any special tools.

On account of the construction employing the rigid uprights 10 and 11 and the rigid connecting members 12 and 15, pivoted to the uprights, the gate can easily be adjusted to any desired tilting position.

A particular advantage of such a gate lies in the fact that when the hinge post pulls back with the stretch of the fence, and lifts the free end of the gate, it is possible to make ready adjustment for lowering the free end to horizontal position.

It is my purpose to cover by my claim any modified form of structure or details which may be reasonably included within their scope and the scope of my invention.

I claim as my invention:

In a vertically tiltable gate, an upright member adapted to be hinged to a support, an upright member at the free end of the gate, vertically spaced horizontal connecting members pivoted at their ends to said upright members, the lower one of said horizontal members being disposed adjacent the bottom of the gate, the combination comprising, a flexible cable secured to the upper end of the hinged upright member and extending diagonally downwardly toward the lower corner of the free end of the gate, said flexible cable having a hook at its lower end, said lower horizontal member having a plurality of horizontally spaced holes therein adjacent the free end of the gate for selectively receiving said hook whereby the tilt of the gate may be adjusted.

JOSEPH B. CLAY.

REFERENCES CITED

The following references are of record in the file of this patent:

UNITED STATES PATENTS

| Number | Name | Date |
| --- | --- | --- |
| 950,671 | Landis | Mar. 1, 1910 |
| 1,033,600 | Leech | July 23, 1912 |
| 1,128,839 | Benz | Feb. 16, 1915 |
| 1,181,335 | Mulrogan | May 2, 1916 |
| 1,228,708 | Sommer | June 5, 1917 |
| 2,249,046 | Royer | July 15, 1941 |

FOREIGN PATENTS

| Number | Country | Date |
| --- | --- | --- |
| 176,788 | Canada | May 1, 1917 |
| 670,793 | Germany | 1939 |